(12) United States Patent
Van Der Wal et al.

(10) Patent No.: US 7,466,657 B1
(45) Date of Patent: Dec. 16, 2008

(54) SYSTEM FOR CHARGING THE USE OF A PACKET-BASED TELECOMMUNICATION NETWORK

(75) Inventors: Jacob Cornelis Van Der Wal, Delft (NL); Michael Robertus Hendrikus Mandjes, Haarlem (NL); Jeroen Jozef Van Lierop, Voorburg (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 09/674,347

(22) PCT Filed: Jun. 7, 1999

(86) PCT No.: PCT/EP99/03950

§ 371 (c)(1),
(2), (4) Date: Oct. 30, 2000

(87) PCT Pub. No.: WO99/65186

PCT Pub. Date: Dec. 16, 1999

(30) Foreign Application Priority Data

Jun. 8, 1998 (NL) .................................. 1009342
Sep. 2, 1998 (NL) .................................. 1009987

(51) Int. Cl.
*H04L 12/26* (2006.01)
(52) U.S. Cl. .................................... 370/252; 370/395.1
(58) Field of Classification Search ................. 370/252, 370/253, 395, 230.1, 232, 233, 234, 395.1
See application file for complete search history.

(56) References Cited

U.S. PATENT DOCUMENTS

| | | | | |
|---|---|---|---|---|
| 4,933,931 A * | 6/1990 | Kokubo | ...................... | 370/259 |
| 5,623,405 A * | 4/1997 | Isono | .......................... | 705/30 |
| 5,894,475 A * | 4/1999 | Bruno et al. | ................. | 370/389 |
| 5,912,880 A * | 6/1999 | Bernstein | ..................... | 370/252 |
| 5,923,740 A * | 7/1999 | Ito et al. | ................. | 379/114.01 |
| 5,953,334 A * | 9/1999 | Morita et al. | ............... | 370/389 |
| 6,104,704 A * | 8/2000 | Buhler et al. | ............... | 370/252 |
| 6,122,514 A * | 9/2000 | Spaur et al. | ................. | 455/448 |
| 6,338,046 B1 * | 1/2002 | Saari et al. | .................... | 705/34 |
| 6,493,767 B1 * | 12/2002 | Ishida et al. | ................ | 709/249 |
| 6,819,672 B1 * | 11/2004 | Corneliussen | ............ | 370/395.1 |

\* cited by examiner

*Primary Examiner*—Firmin Backer
*Assistant Examiner*—Christine Ng
(74) *Attorney, Agent, or Firm*—Michaelson & Associates; Peter L. Michaelson

(57) ABSTRACT

System for charging the use of a packet based telecommunication network. A measuring device (2) measures the number (n) of data units during a period of time (T) or the period of time (t) between a certain number (N) of data units. At any rate, the period of time is short in relation to the total connection time. A calculation device (4) calculates per period of time the number of data units per unit of time and transmits that calculation result (r) to a billing system (5). If the telecommunication system comprises system data units which comprise an indication (r1) of the capacity or priority requested by the user, that indication can also be passed on to the billings system, as well as an indication of the capacity or priority assigned by the telecommunication system.

20 Claims, 1 Drawing Sheet

SYSTEM FOR CHARGING THE USE OF A PACKET-BASED TELECOMMUNICATION NETWORK

BACKGROUND OF THE INVENTION

The invention is related to a system for charging for the use of a packet-based telecommunication network, such as an ATM or IP oriented network.

a. ATM (Asynchronous Transfer Mode)

ATM (Asynchronous Transfer Mode) is a relatively new network technique for supplying connections with very different characteristics in a uniform manner. Each ATM connection has to be paid. Preferably, the amount charged for the connection reflects both the performance delivered by the network and the performance experienced by the customer. In a telephone network such as this, an amount charged is determined by letting the amount be dependent on the duration of the connection (calculated in seconds, minutes or other units, such as "ticks") and on the distance covered. A telephone call is almost always a case of a connection with a fixed capacity (e.g., 64 kbit/s with ISDN). In contrast, ATM is much more flexible and there are more connection parameters and variables than with PSTN (Public Switched Telephone Network) or ISDN (Integrated Services Digital Network) based connections.

With ATM, connections can be established with varying capacity (some kbit/s up to hundreds of Mbit/s).

With ATM, connections can be established with varying network guarantees concerning cell loss, cell delay, cell delay variance and throughput by choosing an "ATM Transfer Capability" (ATC) and Quality of Service class (QoS class). The amount charged for an ATM connection should preferably also reflect this additional flexibility, which is the subject of the present invention. An important aspect in determining the manner of charging for ATM connections is the direction (incentive) that the charging gives to the manner of network usage. In a traditional telephone network, the time-related charge usually assures that the customer does not unnecessarily occupy the connection. In a traditional data network usually a volume rate is used, so that there is an incentive not to burden the network with unnecessary traffic. Another example is the application of an off-peak rate with a plan to shift a portion of the network traffic to periods outside the peak hours so that the network can have a smaller configuration and is thereby less expensive.

The present state of the art usually envisages basing the charge of an ATM connection on two variables, i.e., a time component, the duration of time of the connection (session), and a volume component, the total number of ATM cells transmitted and/or received during the connection. Both variables can easily be measured, registered and processed into a charge during the connection. On processing of the values of the time component, the price per unit can depend on various quantities. Examples of such quantities are the distance covered and time of the day or of the week, comparable with the usual charging for telephone. Examples of other quantities are the ATM parameters such as the Peak Cell Rate of the connection, etc.

There are different ATCs standardized in ITU-T recommendation I.371. Hereafter the limitations for some of the ATCs of choosing a charge that is based on the time and volume component are indicated as described above.

A charge which is exclusively based on the time and volume component as set out in the above, has as a consequence that only the total connection duration and only the total number of cells during the duration of the connection play a role in the charge. For these quantities, (and thereby for the charge) it does not matter whether all cells are offered evenly over the connection duration ("Constant Bit Rate") or are concentrated in one or more bursts of cells ("Variable Bit Rate"). For the network, it is advantageous if the cells offered are spread as much as possible. ATM connections that use SBR (Statistical Bit Rate) are characterized by two additional parameters, the Sustainable Cell Rate (SCR) and the Maximum Burst Size (MBS). The essence of the situation set out above does not change; however, the user experiences no incentive to spread the cells as evenly as possible. While this is beneficial for the total network capacity and consequentially is pursued by the network operator, the question is, in which way can the user can be urged to offer the traffic as evenly as possible. In other words, a method is needed to urge the network user via the charging mechanism to offer the traffic in a less bursty way. If in an ATM network, use is made of an ABR (Available Bit Rate) control mechanism, the network dynamically assigns capacity to each connection. However, it can occur that the network assigns capacity to a connection but that the user does not use or completely use all that capacity, e.g., if the user sends less cells than the assigned capacity allows. With the present charging mechanisms (based on a total time and a total volume component in the charge), leaving capacity assigned by the network unused leads to a lower charge. There is no incentive to use the assigned capacity indeed and there is no incentive to gear the capacity to the actual current need.

b. IP (Internet Protocol)

The IP (Internet Protocol) is a connectionless packet switched technique that is used for the Internet. Current IP networks exclusively supply a so-called best-effort service. The network commits itself to make an effort to deliver the packet (datagram) at the destination but no guarantee is given; the packet can be lost in case of a congestion. It is customary to charge access to the Internet only, e.g., by a fixed amount per month (flat rate) or by a fixed rate per unit of time (hour) that the user is logged onto an Internet Service Provider. In this type of charging, there is no relationship with the amount of data that a user asks or offers.

Because IP is a connectionless technique, there is no matter of "connections" in the same sense as with a telephone or an ATM connection. The aspect of time is therefore inherently unsuitable to serve as measure for network load. To be able to relate the use of an IP network to the network load caused by the network user, another quantity has to be used.

The amount of data can be expressed in different IP units, such as the number of datagrams per unit IP of time and the number of bytes (or bits) per unit of time of which the datagrams consist.

c. Guaranteed IP Services

Recently, work has been done on an extension of the services that an IP network can offer. The aim is, next to the best-effort service described in the above, to also enable an IP network to give guarantees for the throughput and for the delay experienced in the network, comparable with the possibilities that an ATM network offers. The standardization of these new services with guarantees is still in an early stage.

One of the proposed possibilities is to use reservations, e.g., with the protocol RSVP. In that case, it is desirable that the extent of the reservation requested or made and the duration of the reservation is expressed in the charge.

In another proposed approach, some bits in the IP header are used to indicate to which service class the IP packet belongs, e.g., "best-effort" or "guaranteed with short delay". In that case, it is desirable that the indication of the service class also is expressed in the charge.

All considerations as mentioned above for ATM/ABR and ATM/SBR are mutatis also applicable on these new IP services with guarantees.

SUMMARY OF THE INVENTION

The invention provides a charging system in which the charging gives more direction to an efficient network use.

To this end, the invention proposes not to measure and charge the total number of data units (cells, IP datagrams, bytes in IP datagrams) during the whole connection (session), but to subdivide a connection in shorter or longer measuring periods, to measure the number of data units during such measurement periods and base the charging on that. The invention comprises hereunto a measurement device for measuring the number of data units received and/or transmitted during a set period of time, shorter than the time during which said telecommunication connection is open or active. Instead of measuring the number of data units over a fixed period, it is conversely also possible to measure the duration of time between the reception or transmission of a specific number of data units. Furthermore, the invention comprises a calculation device for calculating for each set or measured period of time the number of data units per unit of time and offering that calculation result to a billing system. The calculation device calculates thus per—shorter or longer—period the real data units/time ratio, whereby the billing follows the actual network load more accurately. Thus, for the user an incentive can be created not to offer the data in bursts but more evenly over time and thereby contributing to a more efficient network use.

The measuring period can be equal to the interarrival time of two consecutive cells of a same connection. The rate over the period from ti to and including ti+1 is then equal to 1/(ti+1−ti), in other words, the inverse of the difference of the arrival and send times of two consecutive cells. The measuring period can also be longer, e.g., the time between cell number i and cell number i+n, where n>1. The measuring period can also be a set period, e.g., 100 ms. It will be appreciated that the shorter the measuring period is, the more accurate the measurements are, but also the larger the calculation capacity of the charging computer has to be. Also, it requires transmission traffic between the charging measurement points and the charging computer.

Registering all measured information for all connections can lead to a large amount of data between the registration device and the billing system. A decrease of the amount of data can be achieved by aggregating the data in an aggregation device and transmitting the aggregated data to the billing system.

If a data stream is controlled by the ABR mechanism in ATM, the cell rate assigned (dynamically) by the network is mentioned in the ECR field (Explicit Cell Rate) of so-called backward RM cells. To base the charge, apart from the real transmitted cell rate per measuring period, as proposed in the preceding, also on the capacity assigned by the network, the system can be extended by a device which reads the value that is written in the ECR field. In the same way, the cell rate desired by the user, mentioned in the ECR field of the so-called forward RM cells, can be detected and processed. In this way, the charging is based both on the capacity desire of the user and on the capacity that the network assigns to the user. A comparable function is accomplished in an IP network by reading and registering the size of the reservations desired or made from the reservation messages (e.g., RESV messages of RSVP), or by reading and registering the priority indication in the header of the IP datagram, and adjusting the charge accordingly.

DETAILED DESCRIPTION OF THE INVENTION

ATM: Asynchronous Transfer Mode

Figure 1:
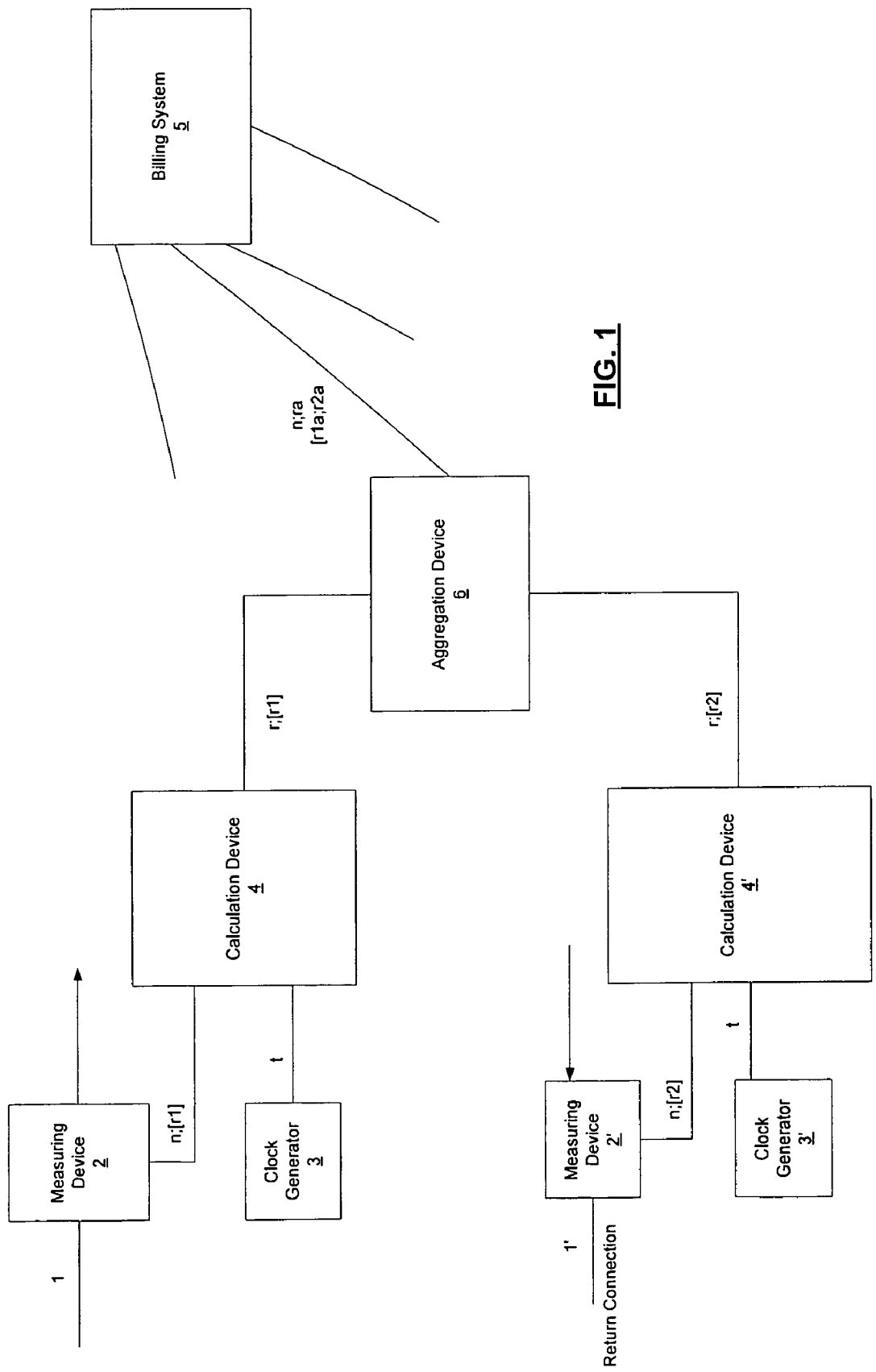
FIG. 1 shows an exemplary embodiment of the invention.

A physical communication line 1 transports ATM cells. The cells can belong to different virtual connections (channels, paths). A measuring device 2 detects from the header of an arriving cell the virtual connection to which the cell belongs. In the measuring device 2 for each (virtual) connection a counter reading is kept up to date with the number of arriving cells. A clock generator 3 generates periodical clock pulses. A calculation device 4 calculates per connection the ratio between the number of arrived cells and the number of clock pulses and passes this ratio on to a billing system 5. According to the invention, this ratio is not calculated over the entire time that a connection is active but over smaller periods. There are therein two possibilities, viz. (per connection) starting from a fixed measuring period T and counting the number n of cells arriving in that period, wherein the ratio r=n/T, or starting from a fixed number of cells N and measuring the time t which is needed for the arriving of those cells, wherein r=N/t.

In order to charge a bursty supply of cells more heavily than an even supply, the fixed periods of measurement T or the fixed number of cells N is chosen in such a way that the ratio n/T or N/t is high in traffic with a (temporary) "burst" character. To create an incentive for an even traffic supply, measurement periods in which the value of r is high are charged more heavily than periods with a low value of r.

In order to let the billing, in a connection which uses ABR, also be dependent on the capacity desired by the user, that value r1 is read by device 2 from passing RM (Resource Management) cells and passed on, through the calculation device 4, to the billing system 5. In the same way a value r2 is extracted, via a return connection 1', in which measuring device 21, a clock generator 3' and a calculation device 4' are included, from the "backward" RM cells, which is an indication for the maximum cell rate which is (dynamically) assigned by the network to the user. That value too, is passed on to the billing system and is included, as well as is the value r1, in the price to be charged to the user.

For use in an IP network (where the packet size may vary) the measuring device (2) is moreover able to measure and register the size of the packet (datagram). The registration includes then the number of IP datagrams and the cumulative number of bytes in those datagrams. A calculation device 4 calculates per connection the ratio between a number of arrived datagrams/bytes and the number of clock pulses and passes both ratios on to a billing system 5. In the same way, via a return connection 1', in which a measuring device 2', a clock generator 3' and a calculation device 4' are included, a value r2 is in the opposite direction extracted from the reservation messages, which is an indication for the reservation promised by the network. That value too is passed on to the billing system and is included, as well as the value r1, in the price to be charged to the user. Instead of relating to the capacity, the parameters r1 and r2 can also relate to the (requested or assigned) priority of the datagrams.

Optionally, as the FIGURE shows, an aggregation device 6 can be added. This device aggregates the periodically generated data from the calculation devices 4 and 4', so that the task of the billing system 5 is relieved and the quantity of billing data to be transported is reduced.

The invention claimed is:

1. A system for use in conjunction with a packet based telecommunication network for determining a charge for a packet connection therethrough, the charge being responsive to dynamic changes in packet loading occurring during the connection, the network carrying system packets (RM, RESV) which comprise first and second indications (r1, r2) of capacity or priority as respectively requested by a user for a connection and, in response thereto, assigned to that connection for the user by the telecommunication system, the system comprising:

a measuring device for measuring a duration (t) of each of a plurality of successively occurring time periods during which a predefined number (N) of packets in a packet stream that belong to a common packet connection are received or transmitted through the connection so as to define corresponding ones of a plurality of measured time periods, wherein the predefined number is less than a total number of packets transported during the connection and the time periods extend substantially throughout an entire duration of the connection;

a billing system, responsive to the measuring device, for formulating a charge for use of the connection;

a first detection device, responsive to the system packets in the packet stream and associated with the connection, for reading out the first indication (r1) from the system packets and transferring the first indication (r1) to the billing system; and a second detection device, responsive to the system packets in the packet stream and associated with the connection, for reading out the second indication (r2) from the system packets and transferring the second indication (r2) to the billing system; and wherein the charge for the connection, as determined by the billing system, reflects the measured duration (t) of each one of the measured time periods, such that a corresponding incremental charge for each one of the periods responsively tracks changes in the packet flow (N/t) then occurring on a period-by-period basis substantially throughout the entire duration of the connection, the charge also reflecting the first and second indications (r1, r2).

2. The system recited in claim 1 further comprising a calculation device, responsive to said measuring device, for calculating a ratio reflective of the number (N) of packets and the duration (t) of each of said measured time periods so as to yield a calculation result (r) for said each measured time period and supplying the calculation result (r) to the billing system for use in formulating the charge.

3. The system recited in claim 2 further comprising an aggregation device for aggregating the calculation result over all of said measured time periods so as to form an aggregate result and passing the aggregate result to the billing system for use in formulating the charge.

4. The system recited in claim 2 further comprising an aggregation device for aggregating said capacity or priority indications provided by the first or second detection devices so as to form aggregate indications and passing the aggregate indications to the billing system for use in formulating the charge.

5. The system recited in claim 1 further comprising an aggregation device for aggregating said capacity or priority indications provided by the first or second detection devices so as to form aggregate indications and passing the aggregate indications to the billing system for use in formulating the charge.

6. The system recited in claim 1 wherein the packet network is an asynchronous transfer mode (ATM) network and the packets are ATM cells.

7. The system recited in claim 6 further comprising a calculation device, responsive to said measuring device, for calculating a ratio reflective of the number (N) of ATM cells and the duration (t) of each of said measured time periods so as to yield a calculation result (r) for said each time period and supplying the calculation result (r) to the billing system for use in formulating the charge.

8. The system recited in claim 7 further comprising an aggregation device for aggregating the calculation result so as to form an aggregate result and passing the aggregate result to the billing system for use in formulating the charge.

9. The system recited in claim 6 further comprising an aggregation device for aggregating said capacity or priority indications provided by the first or second detection devices so as to form aggregate indications and passing the aggregate indications to the billing system for use in formulating the charge.

10. The system recited in claim 7 further comprising an aggregation device for aggregating said capacity or priority indications provided by the first or second detection devices so as to form aggregate indications and passing the aggregate indications to the billing system for use in formulating the charge.

11. A system for use in conjunction with a packet based telecommunication network for determining a charge for a packet connection therethrough, the charge being responsive to dynamic changes in packet loading occurring during the connection, the network carrying system packets (RM, RESV) which comprise first and second indications (r1, r2) of capacity or priority as respectively requested by a user for a connection and, in response thereto, assigned to that connection for the user by the telecommunication system, the system comprising:

a measuring device for ascertaining a number of packets (N) in a packet stream that belong to a common packet connection and are received or transmitted through the connection during each one of a plurality of successive time periods of equal duration (t) so as to define a plurality of packet counts, the time periods extending substantially throughout an entire duration of the connection;

a billing system, responsive to the measuring device, for formulating a charge for use of the connection;

a first detection device, responsive to the system packets in the packet stream and associated with the connection, for reading out the first indication (r1) from the system packets and transferring the first indication (r1) to the billing system; and a second detection device, responsive to the system packets in the packet stream and associated with the connection, for reading out the second indication (r2) from the system packets and transferring the second indication (r2) to the billing system; and wherein the charge for the connection, as determined by the billing system, reflects the packet count (N) for each one of the time periods, such that a corresponding incremental charge for each one of the periods responsively tracks changes in the packet flow (N/t) then occurring on a period-by-period basis substantially throughout the entire duration of the connection, the charge also reflecting the first and second indications (r1, r2).

12. The system recited in claim 11 further comprising a calculation device, responsive to said measuring device, for calculating a ratio reflective of the number (N) of packets in the packet stream during each one of said time periods and the duration (t) of said each time period so as to yield a calculation result (r) for said each time period and supplying the calculation result (r) to the billing system for use in formulating the charge.

13. The system recited in claim 12 further comprising an aggregation device for aggregating the calculation result over all of said time periods so as to form an aggregate result and passing the aggregate result to the billing system for use in formulating the charge.

14. The system recited in claim 12 further comprising an aggregation device for aggregating said capacity or priority indications provided by the first or second detection devices so as to form aggregate indications and passing the aggregate indications to the billing system for use in formulating the charge.

15. The system recited in claim 11 further comprising an aggregation device for aggregating said capacity or priority indications provided by the first or second detection devices so as to form aggregate indications and passing the aggregate indications to the billing system for use in formulating the charge.

16. The system recited in claim 11 wherein the packet network is an asynchronous transfer mode (ATM) network and the packets are ATM cells.

17. The system recited in claim 16 further comprising a calculation device, responsive to said measuring device, for calculating a ratio reflective of the number (N) of packets in the packet stream during each one of said time periods and the duration (t) of said each time period so as to yield a calculation result (r) for said each time period and supplying the calculation result (r) to the billing system for use in formulating the charge.

18. The system recited in claim 17 further comprising an aggregation device for aggregating the calculation result so as to form an aggregate result and passing the aggregate result to the billing system for use in formulating the charge.

19. The system recited in claim 16 further comprising an aggregation device for aggregating said capacity or priority indications provided by the first or second detection devices so as to form aggregate indications and passing the aggregate indications to the billing system for use in formulating the charge.

20. The system recited in claim 17 further comprising an aggregation device for aggregating said capacity or priority indications provided by the first or second detection devices so as to form aggregate indications and passing the aggregate indications to the billing system for use in formulating the charge.

* * * * *